March 2, 1937.   C. A. ALBRECHT   2,072,612
TYPOGRAPHICAL SLUG CASTING MACHINE
Filed March 29, 1935   2 Sheets-Sheet 2

Inventor:
C. A. Albrecht
By
Morrison, Kennedy & Campbell
Attorneys.

Patented Mar. 2, 1937

2,072,612

UNITED STATES PATENT OFFICE 2,072,612

TYPOGRAPHICAL SLUG CASTING MACHINE

Christian Augustus Albrecht, Berlin, Germany, assignor to Mergenthaler Linotype Company, Brooklyn, N. Y., a registered company of New York Application March 29, 1935, Serial No. 13,624
In Germany May 18, 1934

10 Claims. (Cl. 199—54)

In typographical slug casting machines it has already been proposed to machine the printing faces of slugs in the mould by a rotary cutter or equivalent tool (see the Stouges Patent No. 1,982,033, dated November 27, 1934). It is customary for the surfacing device to be mounted on the so-called mould slide, that is to say, on that part which supports the mould disc carrying the moulds. It has been found however, that with such an arrangement there is a liability of vibrations emanating from the driving mechanism of the machine, being transmitted to the mould slide and thence to the surfacing mechanism, with the result that the degree of accuracy in the operation of the latter desirable for finishing the printing surface of a slug, is not fully attained.

The present invention overcomes this difficulty by the fact that the surfacing mechanism is formed as a self-contained unit which is mounted upon a supporting member arranged on the machine frame and connected by a coupling to the mould slide.

The accompanying drawings illustrate, by way of example, one constructional form of the invention. In the said drawings:—

Figure 1:
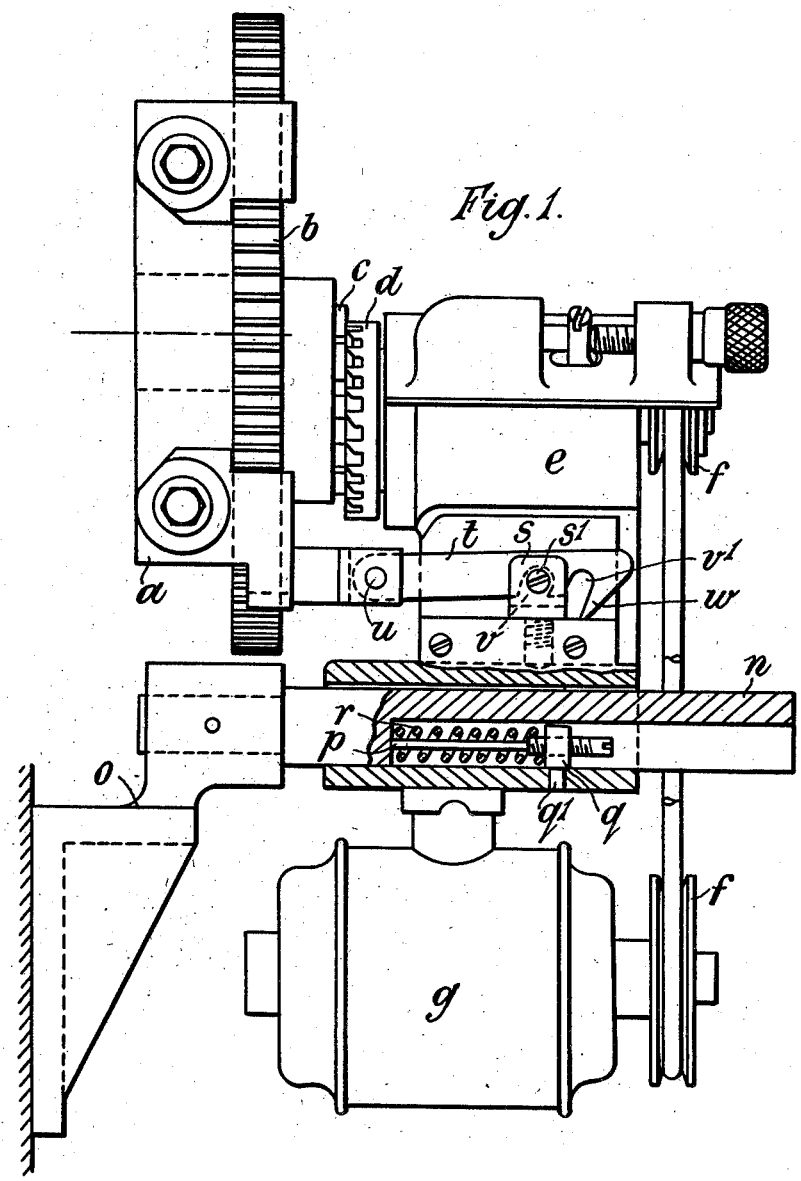
Figure 2:
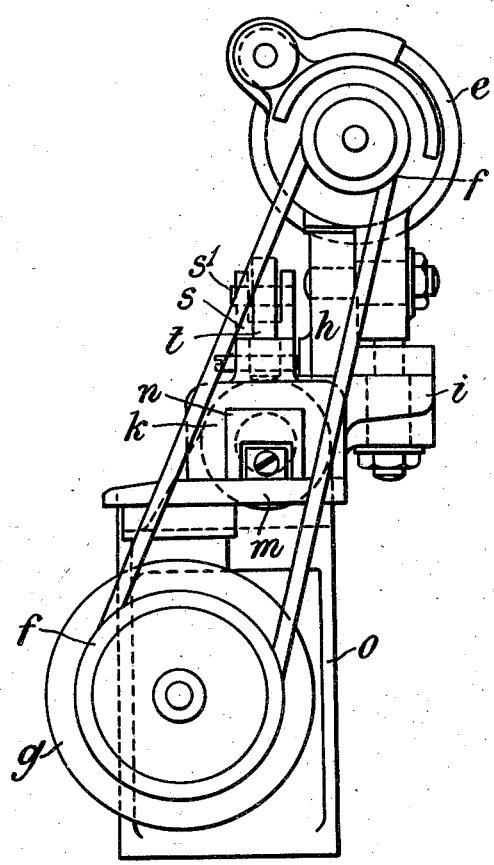

Figure 1 is a side elevation, partly in section, of the pertinent parts of the machine, and Figure 2 is an elevation as viewed from the right of Figure 1.

Referring to the drawings, $a$ is a part of the mould slide, which, as usual, is supported in the machine frame, and is periodically reciprocated from the main driving mechanism of the machine; $b$ is the mould disc carrying the moulds and mounted in the mould slide; $c$ is a slug projecting from a conventional mould in front of the cutter $d$ by which the printing face of the slug is machined. The cutter $d$ forms part of the surfacing mechanism indicated as a whole by the reference letter $e$, which is in itself of known form and therefore need not be described in detail herein. The cutter is driven from a belt $f$ by an electric motor $g$. The surfacing mechanism and the motor are connected together to form a unit. For this purpose the surfacing mechanism is attached to a bracket $h$ secured to a base plate $i$ which is in turn secured to or formed integral with a carrier $k$. The carrier $k$ is substantially cylindrical in shape, and has a rectangular bore closed at the underside by a plate $m$. The plate $m$ supports the motor $g$. The carrier $k$ is adjustably supported by a bar $n$ which engages within the bore of the carrier. The supporting bar $n$ is secured to a bracket $o$ fast to the machine frame, and has a longitudinal rectangular recess within which is housed a rod $p$ encircled by a spring $r$ and at one end threaded into a rectangular nut $q$. By the rectangular formation of the recess in the supporting bar and of the nut $q$ the latter is secured against rotation and guided longitudinally within the recess. The nut $q$ carries a stud $q^1$ which engages in an aperture in the base plate $m^1$ of the carrier $k$. One end of the spring $r$ bears against the nut $q$, and its opposite end bears against the supporting bar $n$ at the inner end of the recess. The said spring thus tends to move the carrier $k$ and the whole surfacing mechanism carried thereby, away from the machine frame. The rod $p$ is so adjusted that its inner end will come into contact with the wall of the recess in the supporting bar when the surfacing mechanism has reached its innermost operative position.

The carrier $k$ is further provided with a forked bearer $s$, the two prongs of which are bridged by a bolt $s^1$. A link $t$, pivotally connected at $u$ to the mould slide $a$ engages at its free end between the prongs of the bearer $s$, being formed at the said end with two open slots $v$ and $v^1$ adapted to hook over the bolt $s^1$. The extreme end of the link $t$ is formed with a nose $w$ which projects downwardly beyond the lower edge of the link.

The apparatus above described operates as follows:

When the cutter is operative, the parts occupy the position shown in Figure 1 of the drawings, the slug $c$ being carried past the cutter $d$ by the rotation of the mould disc $b$ which, as well known, makes a three-quarter rotation after the casting operation to carry the slug from the casting to the ejecting position. The surfacing mechanism is coupled by the link $t$ to the mould slide and consequently participates in the movements thereof, as the said mechanism can reciprocate as a single entity relatively to the fixed supporting bar $n$. In Fig. 1, the parts are shown in their normal position of rest and with the mould slide therefore occupying its rearmost position. Prior to casting the mould slide advances in the usual way to press the mould against the composed line and later, after the casting operation has been completed, the mould slide moves back to its original position of rest. During these forward and backward movements of the mould slide the slug trimming unit will of course move with it due to the connection of the two by the coupling $t$. The spring $r$ ensures that the bolt $s^1$ will be maintained in contact with the wall of the recess $v$ and any play in the connections will be neutralized.

When it is desired to throw the mechanism out of action, it is merely necessary to slightly raise the free end of the link $t$ until the slot $v$ is clear of the bolt $s^1$, when the whole mechanism will move forward under the action of the spring $r$ until the bolt $s^1$ strikes against the nose $w$. The link $t$ can then be depressed in order to secure the device in the inoperative position. The device may be removed entirely from the machine, by completely disengaging the link $t$ from the bolt $s$ and moving the device forwardly along the supporting bar $n$.

The slots $v$ and $v^1$ are preferably arcual, the radius of the arc being struck from the axis of the bolt $u$.

The specific construction above described may be modified; for example instead of a rectangular supporting bar $n$ a round or hexagonal bar, or a round bar with a flattened portion could be used. The coupling means between the surfacing mechanism and the mould slide can be also differently constructed, and the butter could be operated by transmission from the main driving mechanism of the machine, although the drive by a special electric motor is to be preferred.

Having described my invention, I declare that what I claim and desire to secure by Letters Patent is:—

1. In a typographical slug casting machine, the combination with a mould, a mould slide and a slug-trimming unit adapted to trim the printing faces of slugs in the mould, of means fixed to the machine frame adapted to support the slug-trimming unit and relatively to which said unit is movable to active and inactive positions, and coupling means adjustable to connect said unit with the mould slide in either of said positions.

2. In a typographical slug casting machine, the combination with a mould, a mould slide and a slug-trimming unit adapted to trim the printing faces of slugs in the mould, of means fixed to the machine frame adapted to support the slug-trimming unit and relatively to which said unit is movable to active and inactive positions, means normally tending to move said unit from the active to the inactive position, and coupling means adjustable to connect said unit with the mould slide in either of said positions.

3. In a typographical slug casting machine, the combination with a mould, a mould slide and a slug-trimming unit adapted to trim the printing faces of slugs in the mould, of means fixed to the machine frame adapted to support the slug-trimming unit and relatively to which said unit is movable to active and inactive positions, means normally tending to move said unit from the active to the inactive position, a stop adapted to limit the movement of the unit towards the active position and coupling means adjustable to connect said unit with the mould slide in either of said positions.

4. In a typographical slug casting machine, the combination with a mould, a mould slide and a slug-trimming unit adapted to trim the printing faces of slugs in the mould, of means fixed to the machine frame adapted to support the slug-trimming unit and relatively to which said unit is movable to active and inactive positions, means normally tending to move said unit from the active to the inactive position, stops adapted to limit the movement of the unit towards the active and inactive positions respectively and coupling means adjustable to connect said unit with the mould slide in either of said positions.

5. In a typographical slug casting machine, the combination with a mould, a mould slide and a slug-trimming unit adapted to trim the printing faces of slugs in the mould, said unit comprising a carrier, a rotary cutter and means adapted to rotate the cutter, of a bar fixed to the machine frame adapted to support the carrier, and coupling members located respectively on the carrier and on the mould slide adapted to connect together said unit and slide.

6. In a typographical slug casting machine, the combination with a mould, a mould slide and a slug-trimming unit adapted to trim the printing faces of slugs in the mould, said unit comprising a carrier, a rotary cutter and means adapted to rotate the cutter, of a bar fixed to the machine frame adapted to support the carrier and relatively to which the carrier is movable to bring the slug-trimming unit to active and inactive positions, and coupling members located respectively on the carrier and on the mould slide adjustable to connect together said unit and slide in either active or inactive position.

7. In a typographical slug casting machine, the combination with a mould, a mould slide and a slug-trimming unit adapted to trim the printing faces of slugs in the mould, said unit comprising a carrier, a rotary cutter and a motor adapted to drive the cutter, of a bar fixed to the machine frame adapted to support the carrier and relatively to which the carrier is movable to bring the slug-trimming unit to active and inactive positions, a coupling member mounted on the carrier, and an arm pivoted on the mould slide having open slots respectively adapted to engage said coupling member in the active and inactive positions of the slug-trimming unit.

8. In a typographical slug casting machine, the combination with a mould, a mould slide and a slug-trimming unit adapted to trim the printing faces of slugs in the mould, said unit comprising a carrier, a rotary cutter and a motor adapted to drive the cutter, of a bar fixed to the machine frame adapted to support the carrier and relatively to which the carrier is movable to bring the slug-trimming unit to active and inactive positions, a spring normally tending to move said unit from the active to the inactive position, a stop associated with the carrier and carrier supporting bar adapted to limit the movement of said unit towards the active position, a coupling member mounted on the carrier, an arm pivoted on the mould slide having open slots respectively adapted to engage said coupling member in the active and inactive positions, of the slug-trimming unit, and an abutment on the arm adapted to limit the movement of the unit towards the inactive position.

9. In a typographical slug casting machine, the combination with a mould, a fore-and-aft movable slide on which the mould is mounted, a rotary power driven face cutter adapted to trim the printing faces of slugs in the mould, a support for the slug trimming unit, said support being slidably mounted in the fixed machine frame to move fore-and-aft parallel to the mould slide, and coupling means adapted to connect said sliding support with the mould slide to maintain the slug trimming unit in proper relation to the mould in all positions of the mould slide.

10. In a typographical slug casting machine, the combination with a mould, a rotary disc carrying the mould, a reciprocable slide on which the mould disc is mounted, and a slug-trimming unit adapted to trim the printing faces of slugs cast in the mould, of means fixed to the machine frame and adapted to support the slug-trimming unit for movement with the mould slide, and coupling means adapted to connect said unit with the mould slide independently of the mould disc.

CHRISTIAN AUGUSTUS ALBRECHT.